United States Patent
Liang et al.

(10) Patent No.: US 9,025,649 B2
(45) Date of Patent: May 5, 2015

(54) METHOD AND APPARATUS FOR ACQUIRING ESTIMATED VALUE OF TRANSMITTED SIGNAL AND A SYSTEM-ON-CHIP

(71) Applicant: Spreadtrum Communications (Shanghai) Co., Ltd, Shanghai (CN)

(72) Inventors: Jingxin Liang, Shanghai (CN); Yu Dong, Shanghai (CN)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 146 days.

(21) Appl. No.: 13/788,506

(22) Filed: Mar. 7, 2013

(65) Prior Publication Data

US 2013/0235917 A1  Sep. 12, 2013

(30) Foreign Application Priority Data

Mar. 7, 2012 (CN) .......................... 2012 1 0058708

(51) Int. Cl.
*H04L 25/02* (2006.01)
*H04L 27/26* (2006.01)

(52) U.S. Cl.
CPC ............ *H04L 25/024* (2013.01); *H04L 25/022* (2013.01); *H04L 27/2647* (2013.01)

(58) Field of Classification Search
CPC ................................. H04L 27/06; H04L 27/28
USPC .................. 375/224, 340, 347, 259, 260, 346
See application file for complete search history.

(56) References Cited

U.S. PATENT DOCUMENTS

| 8,379,772 B2 * | 2/2013 | Koike et al. .................... 375/340 |
| 8,693,560 B2 * | 4/2014 | Shimezawa et al. .......... 375/260 |
| 2008/0123758 A1 * | 5/2008 | Paik et al. ...................... 375/260 |
| 2008/0137769 A1 * | 6/2008 | Hwang et al. ................. 375/267 |

(Continued)

FOREIGN PATENT DOCUMENTS

| CN | 1925471 A | 3/2007 |
| CN | 101340227 A | 1/2009 |

(Continued)

OTHER PUBLICATIONS

Foreign Communication From a Related Counterpart Application, Chinese Application No. 201210058708.3, Chinese Office Action dated Jan. 17, 2014, 7 pages.

*Primary Examiner* — Jaison Joseph

(57) ABSTRACT

The embodiments of the disclosure disclose a method and an apparatus for acquiring estimated values of transmitted signals, and a system-on-chip. The method comprises: in response to the sequence number N of a current OFDM symbol between sequence numbers N1 and N2 that are sequence numbers of two adjacent OFDM symbols containing pilots, for each RE within the Nth OFDM symbol, instantaneously acquiring a channel estimation value $C_N^i$ of the RE by a linear interpolation method; extracting an FFT value of the ith RE from an FFT buffer unit, and based on a preset MIMO demodulation algorithm, performing computation on the $C_N^i$ and the FFT value of the ith RE, thereby obtaining an estimated value of transmitted signals fro on the ith RE within the Nth OFDM symbol. The embodiments of the disclosure can save SOC memory, reduce SOC chip cost, and enhance SOC information processing performance.

14 Claims, 10 Drawing Sheets

(56) References Cited

U.S. PATENT DOCUMENTS

| | | | |
|---|---|---|---|
| 2009/0245091 A1* | 10/2009 | Lin et al. | 370/210 |
| 2010/0097937 A1 | 4/2010 | Pietraski et al. | |
| 2011/0075743 A1* | 3/2011 | Koike et al. | 375/259 |
| 2011/0305286 A1* | 12/2011 | Shimezawa et al. | 375/260 |
| 2012/0147761 A1* | 6/2012 | Zhang et al. | 370/252 |
| 2012/0219079 A1* | 8/2012 | Yoshimoto et al. | 375/260 |
| 2012/0250808 A1* | 10/2012 | Lomnitz et al. | 375/346 |

FOREIGN PATENT DOCUMENTS

| | | |
|---|---|---|
| CN | 101364961 A | 2/2009 |
| CN | 102255840 A | 11/2011 |

* cited by examiner

METHOD AND APPARATUS FOR ACQUIRING ESTIMATED VALUE OF TRANSMITTED SIGNAL AND A SYSTEM-ON-CHIP

CROSS-REFERENCE TO RELATED APPLICATION

This application claims priority to Chinese Patent Application No. 201210058708.3, filed on Mar. 7, 2012 and entitled "Method and Apparatus for Acquiring Estimated Value of Transmitted Signal and a System-On-Chip," which is incorporated herein by reference in its entirety.

TECHNICAL FIELD

Embodiments of the present disclosure relate to field of communication technology, and more specifically, relate to a method and an apparatus for acquiring estimated value of transmitted signal and a system-on-chip.

BACKGROUND

Long term evolution (hereinafter, abbreviated as LTE) communication system is an evolution of the third generation mobile communication system (hereinafter, abbreviated as 3G). Different from a circuit switching mode adopted in conventional cellular systems, LTE communication system only supports packet switching service and can provide a higher service transmission rate, i.e. providing respectively an uplink peak data rate of 100 Mbit/s and a downlink peak data rate of 50 Mbit/s within a bandwidth of 20 MHz, thereby providing more colourful services for users.

LTE communication system can concurrently employ a frequency division duplex (hereinafter, abbreviated as FDD) mode and a time division duplex (hereinafter, abbreviated as TDD) mode in a unified framework. LTE communication system that employs a TDD mode is also referred to as TD-LTE system. FIG. 1 is a schematic view of a frame structure in a TD-LTE system under a switching cycle of 5 ms. As shown in FIG. 1, each wireless frame has a length of 10 ms ($T_f$=307,200×$T_s$=10 ms), consisting of two half-frames each having a length of 5 ms (153,600×$T_s$=5 ms). Each half-frame consists of five sub-frames each having a length of 1 ms (30,720×$T_s$=1 ms), wherein, each sub-frame contains two slots. FIG. 2 is a schematic view of a wireless resource structure of each slot in a downlink wireless frame. As shown in FIG. 2, each downlink slot Tslot comprises $N_{symb}^{DL}$ orthogonal frequency division multiplexing (hereinafter, abbreviated as OFDM) symbols and each OFDM symbol contains $N_{RB}^{DL} * N_{SC}^{RB}$ sub-carriers in a frequency domain. One sub-carrier in one OFDM symbol is taken as a minimum wireless resource unit, which is referred to as resource element (hereinafter, abbreviated as RE). Thus, each downlink slot Tslot comprises $N_{RB}^{DL} * N_{SC}^{RB}$ sub-carriers, i.e. comprising $N_{RB}^{DL} * N_{SC}^{RE}$ REs wherein, 12*$N_{symb}^{DL}$ REs together constitute one resource block (hereinafter, abbreviated as RB).

In the TD-LTE system, due to wireless channel distortion, relative to a transmitting terminal, complex band-based signals (hereinafter, abbreviated as complex signal) carried by each RE at a receiving terminal are all superimposed with variations of amplitude and phase. Thus, the receiving terminal can obtain these variations so as to restore an original signal transmitted from the transmitting terminal.

FIG. 3 is an example of diagram of a reference channel of two consecutive RBs. As shown in FIG. 3, REs in diagonal filling parts represent channels of pilots, which are also referred to as pilot channels. Transmitted signals transmitted from the transmitting terminal on pilot channels are known. As a result, by comparing transmitted signals transmitted from the transmitting terminal on a pilot channel with a complex signal received by the receiving terminal on the same pilot channel, properties of a wireless channel through which the transmitted signals have passed can be obtained, wherein, the complex signal received by the receiving terminal comprises I-orthogonal signal and Q-orthogonal signal.

Currently, a channel estimation method as follows has been particularly adopted for performing channel estimation processing on wireless channels corresponding to the REs in an OFDM symbols.

For an OFDM symbol containing pilots, channel estimation is performed on the pilots contained therein, thereby obtaining channel estimation values of these pilots, and channel estimation values of all the non-pilots within the OFDM symbol containing pilots are obtained by smoothing in a frequency domain, assuming that the channel estimation value of the ith RE in the Kth OFDM symbol is represented as $C_K^i$.

Taking two adjacent OFDM symbols containing pilots as a LTE reference signal (hereinafter, abbreviated as RS) symbol, it is assumed that the sequence numbers of the two OFDM symbols that serve as the LTE RS symbol are N1 and N2 respectively. A channel estimation value of a corresponding RE in an OFDM symbol containing no pilots between the two OFDM symbols whose sequence numbers are N1 and N2 respectively is obtained by using a linear interpolation method.

In the prior art, the following method has been particularly adopted to obtain estimated values for transmitted signals of a transmitting terminal on each RE within respective OFDM symbols.

After a receiving terminal has received OFDM symbols, a Fast Fourier Transform (hereinafter, abbreviated as FFT) is performed respectively on each of the received OFDM symbols, thereby obtaining FFT values and storing these FFT values in an FFT buffer unit. A channel estimation (hereinafter, abbreviated as CHE) unit extracts OFDM symbols containing pilots from the FFT buffer unit, and based on the currently channel estimation method described above, channel estimation processing is performed on wireless channels corresponding to REs within OFDM symbols, thereby obtaining channel the estimation value of each RE in the respective OFDM symbol and storing these values in a CHE buffer unit. A multiple input multiple output (hereinafter, abbreviated as MIMO) demodulation unit extracts FFT values and channel estimation values corresponding to the same RE respectively from the FFT buffer unit and the CHE buffer unit one OFDM symbol by one OFDM symbol and one RE by one RE, and computation processing is performed based on a preset MIMO demodulation algorithm, thereby obtaining estimated values for transmitted signals of the transmitting terminal on each RE within the respective OFDM symbols.

It has presently been found that the method for acquiring an estimated value of a transmitted signal according to the prior art has at least the following problems.

It needs a CHE unit to store channel estimation values of all the OFDM symbols between two LTE RS symbols, such that MIMO demodulation unit can calculate estimated values for transmitted signals of the transmitting terminal on each RE in all the OFDM symbols between two LTE RS symbols based on channel estimation values and FFT values. It thus takes up more system-on-chip (hereinafter, abbreviated as SOC)

memory of the receiving terminal, and results in increasing the cost and degrading information processing performance of a SOC.

SUMMARY

The embodiments as set forth herein solve the following technical problems, i.e. providing a method and an apparatus for acquiring an estimated value of transmitted signal and a system-on-chip, thereby saving SOC memory, reducing SOC chip cost, and enhancing SOC information processing performance.

In one embodiment there is provided a method for acquiring an estimated value of transmitting signal, comprising:

in response to the current orthogonal frequency division multiplexing (OFDM) symbol with sequence number N being between two adjacent OFDM symbols with sequence numbers N1 and N2 containing pilots, for each resource element (RE) within the Nth OFDM symbol, instantaneously acquiring a channel estimation value $C_N^i$ of the RE by adopting a linear interpolation method, wherein, $C_N^i$ represents a channel estimation value of the ith RE within the Nth OFDM symbol, i∈[0,L−1], each OFDM symbol includes L REs, L is an integer larger than zero; and extracting an FFT value of the ith RE within the Nth OFDM symbol from a Fast Fourier Transform (FFT) buffer unit, and based on a preset multiple input multiple output (MIMO) demodulation algorithm, performing computation processing on the channel estimation value $C_N^i$ and the FFT value of the ith RE within the Nth OFDM symbol, thereby obtaining an estimated value for transmitted signals of a transmitting terminal on the ith RE within the Nth OFDM symbol.

In another embodiment, there is provided an apparatus for acquiring an estimated value of transmitting signal, comprising:

a CHE unit, for, in response to a sequence number N of a current OFDM symbol being between sequence numbers N1 and N2 of two adjacent OFDM symbols containing pilots, for each RE within the Nth OFDM symbol, instantaneously acquiring a channel estimation value $C_N^i$ of the RE by adopting a linear interpolation method, wherein, $C_N^i$ represents a channel estimation value of the ith RE within the Nth OFDM symbol, i∈[0,L−1], each OFDM symbol includes L REs, L is an integer larger than zero; and a MIMO demodulation unit, for, extracting an FFT value of the ith RE within the Nth OFDM symbol from an FFT buffer unit, and based on a MIMO demodulation algorithm, performing computation processing on the channel estimation value $C_N^i$ and the FFT value of the ith RE within the Nth OFDM symbol, thereby obtaining an estimated value for transmitted signals of a transmitting terminal on the ith RE within the Nth OFDM symbol.

In yet other embodiments, there is provided a system-on-chip comprising the apparatus for acquiring an estimated value of transmitted signal provided by the above embodiments of the disclosure.

The embodiments as covered by this disclosure also provide a receiving device comprising the SOC provided by the above embodiments.

Based on the method and apparatus for acquiring an estimated value of transmitted signal as well as the system-on-chip provided by the above embodiments, as for an OFDM symbol between two adjacent OFDM symbols containing pilots, a channel estimation value $C_N^i$ for each RE therein is instantaneously acquired by adopting a linear interpolation method, an FFT value of the current RE is extracted from the FFT buffer unit, and computation processing is performed on the channel estimation value $C_N^i$ and the FFT value of the current RE based on the preset MIMO demodulation algorithm, thereby obtaining an estimated value for transmitted signals of the transmitting terminal on the current RE. The embodiments of the disclosure do not need to store channel estimation values of the respective OFDM symbols between two adjacent OFDM symbols containing pilots, which, compared with the prior art, can save SOC memory that would be taken up by storing channel estimation values of the respective OFDM symbols between two adjacent OFDM symbols containing pilots, and thus reduce SOC chip cost and enhance SOC information processing performance.

BRIEF DESCRIPTION OF THE DRAWINGS

For a more complete understanding of the embodiments as presented herein, reference is now made to the following descriptions taken in conjunction with the accompanying drawings, in which.

DETAILED DESCRIPTION

It should be understood that the following described embodiments are merely part of the embodiments of the disclosure, but not all the embodiments. Based on the embodiments of the disclosure, one of ordinary skill in the art can obtain all the other embodiments without paying any creative efforts, and all of these embodiments fall into the protected scope of the disclosure.

Figure 4:
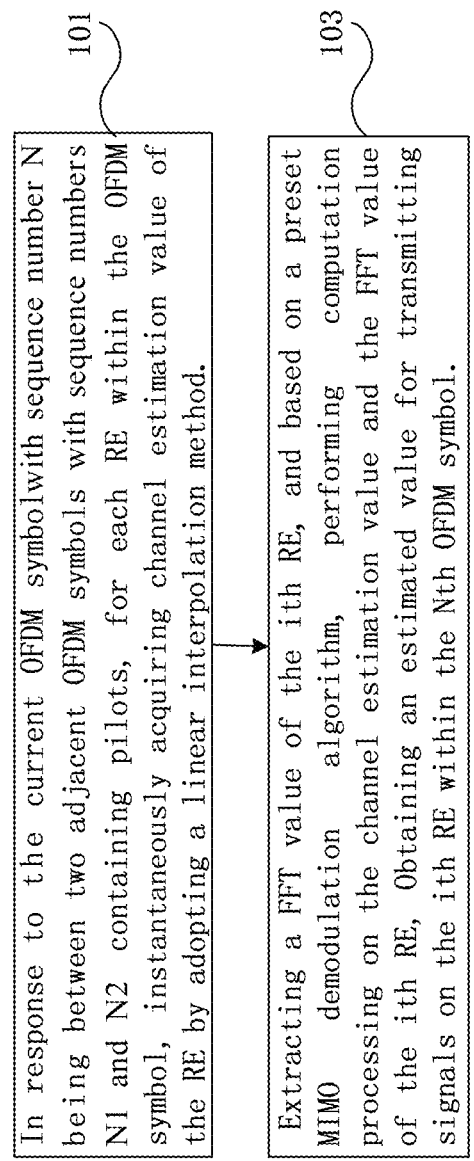
FIG. 4 is a flowchart of the method for acquiring an estimated value of transmitted signal according to an embodiment of the disclosure.

FIG. 4 is a flowchart of the method for acquiring an estimated value of transmitted signal according to an embodiment of the disclosure. As shown in FIG. 4, the method for acquiring an estimated value of transmitted signal according to this embodiment comprises:

101. In response to the sequence number N of a current OFDM symbol being between sequence numbers N1 and N2 of two adjacent OFDM symbols containing pilots, i.e. the current OFDM symbol being an OFDM symbol between any two adjacent OFDM symbols containing pilots, for each RE within the Nth OFDM symbol, instantaneously acquiring a channel estimation value $C_N^i$ of the RE by adopting a linear interpolation method, Wherein i∈[0,L−1], each OFDM symbol includes L REs, and L is an integer larger than zero.

Among OFDM symbols received by a receiving device, OFDM symbols that contain pilots can be numerous. In the various embodiments of the disclosure, N1 and N2 respectively represent sequence numbers of any two adjacent OFDM symbols containing pilots. For example, if OFDM symbols respectively having sequence numbers of 1, 5, 8, 11 contain pilots, then N1 and N2 can take the following three sets of values for [N1, N2], i.e. [1, 5], [5, 8] and [8, 11]. Accordingly, N takes values of an integer larger than 1 and smaller than 5, an integer larger than 5 and smaller than 8, and an integer larger than 8 and smaller than 11, respectively. A receiving device can know sequence numbers of all OFDM symbols containing pilots according to a frame structure stipulated by the adopted communication protocol, for example, according to a frame structure stipulated by protocol 3GPP TS36.211 V8.3.0.

103. An FFT value of the ith RE within the Nth OFDM symbol is extracted from an FFT buffer unit, and based on a preset MIMO demodulation algorithm, computation processing is performed on the channel estimation value $C_N^i$ and the FFT value of the ith RE within the Nth OFDM symbol, thereby an estimated value for transmitted signals of a transmitting terminal on the ith RE within the Nth OFDM symbol is obtained.

According to the method for acquiring an estimated value of transmitted signal provided by the above embodiment of the disclosure, as for an OFDM symbol located between two adjacent OFDM symbols containing pilots, a channel estimation value $C_N^i$ for each RE therein is instantaneously acquired by adopting a linear interpolation method, an FFT value of the current RE is extracted from the FFT buffer unit. Computation processing is performed on the channel estimation value $C_N^i$ and the FFT value of the current RE based on the preset MIMO demodulation algorithm, thereby an estimated value for transmitted signals of the transmitting terminal on the current RE is obtained. The embodiment of the disclosure does not require the receiving device of the receiving terminal to store channel estimation values of the respective OFDM symbols between two adjacent OFDM symbols containing pilots, which can save SOC memory that would be taken up by the receiving device for storing channel estimation values of the respective OFDM symbols between two adjacent OFDM symbols containing pilots, and thus reduce SOC chip cost and enhance SOC information processing performance.

Figure 5:
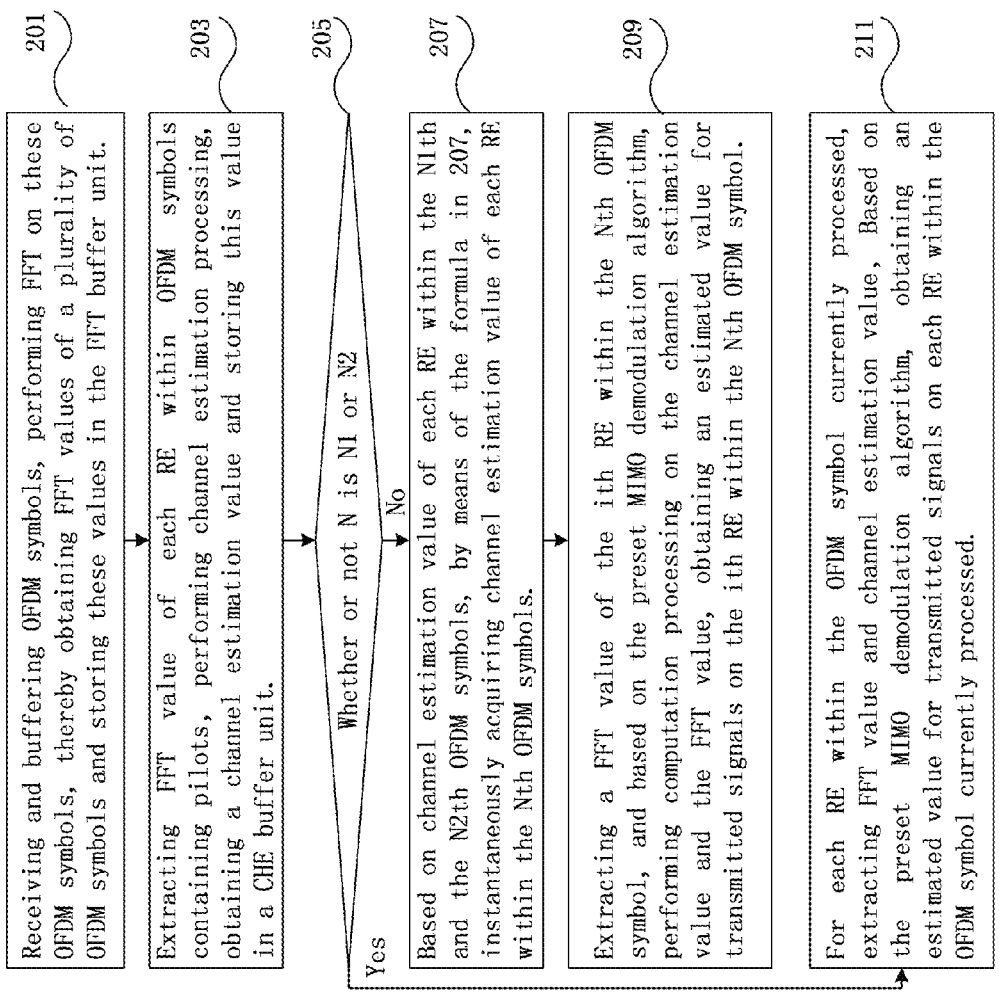
FIG. 5 is a flowchart of the method for acquiring an estimated value of transmitted signal according to an embodiment of the disclosure.

FIG. 5 is a flowchart of the method for acquiring an estimated value of transmitted signal according to an embodiment of the disclosure. As shown in FIG. 5, the method for acquiring an estimated value of transmitted signal transmitted signal according to this embodiment comprises:

201. Receiving and buffering OFDM symbols, performing FFT on the received and buffered OFDM symbols sequentially, thereby obtaining FFT values of a plurality of buffered OFDM symbols and storing these values in the FFT buffer unit, wherein, in the FFT buffer unit, there include FFT values of the N1th OFDM symbol to the N2th OFDM symbol.

By way of example, the operation of 201 can be realized by means of a receiving unit and an FFT unit.

203. Extracting sequentially from the FFT buffer unit FFT value of each RE within OFDM symbols containing pilots and performing channel estimation processing, thereby obtaining a channel estimation value $C_K^i$ and storing this value in a CHE buffer unit, wherein, i∈[0,L−1], the values taken by K include N1 and N2.

By way of example, the operation of 203 can be realized by means of a CHE unit.

205. Identifying whether or not the sequence number N of the OFDM symbol currently computed and processed is the sequence number N1 or N2. N1 or N2 are the sequence number of two adjacent OFDM symbols containing pilots. That is, identifying whether or not the OFDM symbol currently processed is one of two adjacent OFDM symbols containing pilots.

In response to that the sequence number N of the OFDM symbol currently processed is the sequence number N1 or N2 of two adjacent OFDM symbols containing pilots, the operation of 211 is executed.

Otherwise, in response to that the sequence number N of the OFDM symbol currently processed is between the sequence numbers N1 and N2, that is, the OFDM symbol currently processed is an OFDM symbol between two adjacent OFDM symbols containing pilots, the operation of 207 is executed.

207. Based on channel estimation value $C_K^i$ of each RE within the N1th and the N2th OFDM symbols, by means of formula $$C_N^i = \frac{(N-N1)*C_{N_2}^i + (N2-N)*C_{N_1}^i}{N2-N1}$$

instantaneously acquiring channel estimation value $C_N^i$ of each RE within the Nth OFDM symbols, wherein, N1<N2.

By way of example, the operation of 205 can be realized by means of a MIMO demodulation unit, and the operation of 207 can be realized by using MIMO demodulation unit to instruct CHE unit.

209. Extracting an FFT value of the ith RE within the Nth OFDM symbol from the FFT buffer unit, and based on the preset MIMO demodulation algorithm, performing computation processing on the channel estimation value $C_N^i$ and the FFT value of the ith RE within the Nth OFDM symbol, thereby obtaining an estimated value for transmitted signals of the transmitting terminal on the ith RE within the Nth OFDM symbol.

Thereafter, the subsequent flows of this embodiment will not be carried out.

211. For each RE within the OFDM symbol currently computed and processed, extracting FFT value and channel estimation value corresponding to this RE from the FFT buffer unit and the CHE buffer unit respectively, and based on the preset MIMO demodulation algorithm, performing computation processing on the FFT value and the channel estimation value corresponding to this RE, thereby obtaining an estimated value for transmitted signals of the transmitting terminal on each RE within the OFDM symbol currently processed.

By way of example, the operations of 209 and 211 can be realized by means of a MIMO demodulation unit.

In the above embodiment, only channel estimation values of OFDM symbols containing pilots are stored in the CHE buffer unit. As for channel estimation value of each RE within OFDM symbols containing no pilots, when computation processing needs to be performed, it can be instantaneously acquired by the CHE unit adopting a linear interpolation method through the use of channel estimation value of each RE within two adjacent OFDM symbols containing pilots, but does not need to be pre-computed and stored, which thus saves SOC memory that would be taken up by the receiving device for storing channel estimation values of OFDM symbols containing no pilots in the prior art, and reduces SOC chip cost and enhances SOC information processing performance. SOC memory herein includes memory required by the receiving unit for buffering OFDM symbols, the FFT buffer unit and the CHE buffer unit.

That is, in the above embodiment shown in FIG. 5, when the value of i sequentially is 0, 1, 2 ... L−1, the operations from 207 to 209 are executed respectively. When an estimated value for transmitted signals of the transmitting terminal on the (L−1)th RE within the Nth OFDM symbol is obtained by the operation of 209, computation processing for this Nth OFDM symbol is completed, and then a next OFDM symbol is being processed. At this point, N is assigned a value of N+1 (N=N+1), i.e. taking N+1 as N, and then the operation of 205 is executed to identify whether or not N+1 is between N1 and N2.

In a specific application, channel estimation value $C_N^i$ of the ith RE within the Nth OFDM symbol containing no pilots can be instantaneously acquired by the CHE unit, and computation processing is performed on the FFT value and the channel estimation value $C_N^i$ corresponding to the same RE by the MIMO demodulation unit, thereby obtaining an estimated value for transmitted signals of the transmitting terminal on this RE. Since the working frequency of the MIMO demodulation unit is designed to be relatively high in a practical application, when MIMO demodulation unit needs to acquire channel estimation value data of each RE within the N1th or the N2th OFDM symbol from the CHE unit, it can directly extract it from the CHE buffer unit. However, when the channel estimation value data that needs to be extracted by the MIMO demodulation unit does not exist in the CHE buffer unit and needs to be instantaneously acquired by the CHE unit adopting a linear interpolation method, in order to ensure that the speed for instantaneously acquiring channel estimation values by the CHE unit can meet the real-time requirement of the MIMO demodulation unit and the request for extracting channel estimation value data by the MIMO demodulation unit can be quickly responded, according to another embodiment of the method for acquiring an estimated value of transmitted signal of the disclosure, when the CHE unit adopts a linear interpolation method to acquire channel estimation value $C_N^i$ of the ith RE within the Nth OFDM symbol, specifically, the channel estimation value $C_N^i$ of the ith RE within the Nth OFDM symbols can be acquired by adopting a linear interpolation method one tap or several taps earlier according to the sequence of the computation processing performed by the MIMO demodulation unit on the channel estimation values and then can be stored in the no pilot channel estimation (NPCHE) buffer unit for being extracted by the MIMO demodulation unit. This NPCHE buffer unit needs to have a depth sufficient to ensure that the MIMO demodulation unit can consecutively extract channel estimation value data from the NPCHE buffer unit without waiting. For example, this NPCHE buffer unit can have a depth of 8, which can be adjusted as needed. According to one example of the embodiments of the disclosure, but not limitative, the NPCHE buffer unit herein can be a first in first out (hereinafter, abbreviated as FIFO) buffer.

Figure 6:
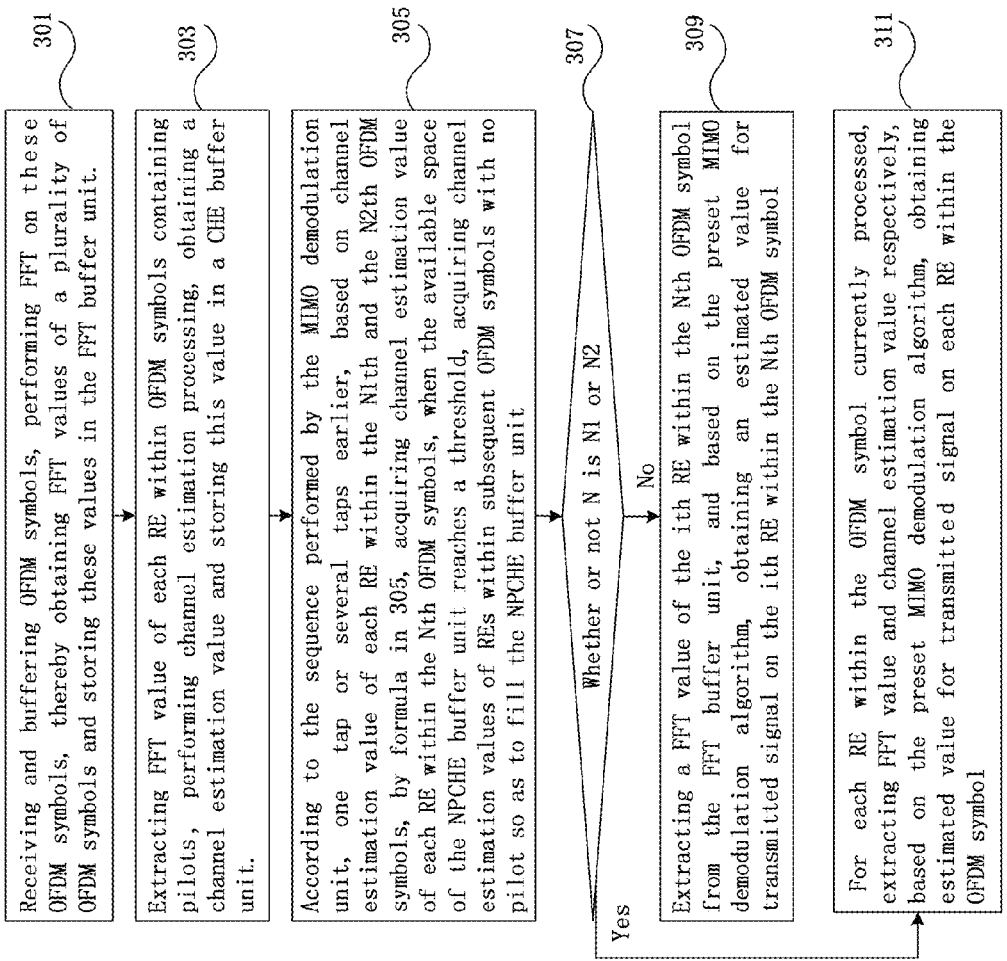
FIG. 6 is a flowchart of the method for acquiring an estimated value of transmitted signal according to an embodiment of the disclosure.

FIG. 6 is a flowchart of the method for acquiring an estimated value of transmitted signal according to an embodiment of the disclosure. As shown in FIG. 6, the method for acquiring an estimated value of transmitted signal of this embodiment comprises:

301. Receiving and buffering OFDM symbols, performing FFT on the received and buffered OFDM symbols sequentially, thereby obtaining FFT values of a plurality of buffered OFDM symbols and storing these values in the FFT buffer unit. In the FFT buffer unit, there include FFT values of the N1th OFDM symbol to the N2th OFDM symbol.

By way of example, the operation of 301 can be realized by means of a receiving unit and an FFT unit.

303. Extracting sequentially from the FFT buffer unit FFT value of each RE within OFDM symbols containing pilots and performing channel estimation processing, thereby obtaining a channel estimation value $C_K^i$ and storing this value in a CHE buffer unit, wherein, i∈[0,L−1], the values taken by K include N1 and N2.

305. According to the sequence of computation processing performed on channel estimation values by the MIMO demodulation unit, one tap or several taps earlier, based on channel estimation value $C_K^i$ of each RE within the N1th and the N2th OFDM symbols, by means of formula $$C_N^i = \frac{(N-N1)*C_{N_2}^i + (N2-N)*C_{N_1}^i}{N2-N1}$$

acquiring channel estimation value $C_N^i$ of each RE within the Nth OFDM symbols and storing this value in the NPCHE buffer unit, and when it is monitored that the available space of the NPCHE buffer unit reaches a preset space threshold, for example, when the idle space of the NPCHE buffer unit reaches ¼ or ½ of the storage space of the NPCHE buffer unit, or when the storage space of the NPCHE buffer unit is empty, acquiring channel estimation values of REs within subsequent OFDM symbols containing no pilots so as to fill the NPCHE buffer unit.

Wherein, N1<N2; Within the Nth OFDM symbol, the value of i sequentially is 0, 1, 2 ... L−1; when the value of i is larger than L−1, N is assigned a value of N+1 (N=N+1), i.e. taking N+1 as N, and i is restarted from zero, taking a value of an integer.

By way of example, the operations of 303 and 305 can be realized by a CHE unit. In the operation of 305, when it is monitored that the available space of the NPCHE buffer unit reaches a preset space threshold, the operation of acquiring channel estimation values of REs within subsequent OFDM symbols containing no pilots so as to fill the NPCHE buffer unit can be performed in parallel with the subsequent operations.

307. Identifying whether or not the sequence number N of the OFDM symbol currently computed and processed is the sequence number N1 or N2 of two adjacent OFDM symbols containing pilots, that is, identifying whether or not the OFDM symbol currently processed is one of two adjacent OFDM symbols containing pilots.

In response to that the sequence number N of the OFDM symbol currently processed is the sequence number N1 or N2 of two adjacent OFDM symbols containing pilots, the operation of 311 is executed.

Otherwise, in response to that the sequence number N of the OFDM symbol currently processed is between the sequence numbers N1 and N2, that is, the OFDM symbol currently processed is an OFDM symbol between two adjacent OFDM symbols containing pilots, the operation of 309 is executed.

309. Extracting an FFT value of the ith RE within the Nth OFDM symbol from the FFT buffer unit, extracting a channel estimation value $C_N^i$ of the ith RE within the Nth OFDM symbol from the NPCHE buffer unit, and based on the preset MIMO demodulation algorithm, performing computation processing on the channel estimation value $C_N^i$ and the FFT value of the ith RE within the Nth OFDM symbol, thereby obtaining an estimated value for transmitted signals of the transmitting terminal on the ith RE within the Nth OFDM symbol.

Thereafter, the subsequent flows of this embodiment will not be carried out.

311. For each RE within the OFDM symbol currently computed and processed, extracting FFT value and channel estimation value corresponding to this RE from the FFT buffer unit and the CHE buffer unit respectively, and based on the preset MIMO demodulation algorithm, performing computation processing on the FFT value and the channel estimation value corresponding to this RE, thereby obtaining an estimated value for transmitted signals of the transmitting terminal on each RE within the OFDM symbol currently processed.

By way of example, the operations of 309 and 311 can be realized by means of a MIMO demodulation unit.

That is, in the above embodiment shown in FIG. 6, when the value of i sequentially is 0, 1, 2 ... L−1, the operation of 309 is executed respectively. When an estimated value for transmitted signals of the transmitting terminal on the (L−1)th RE within the Nth OFDM symbol is obtained by the operation of 309. Computation processing for this Nth OFDM symbol is completed, and then a next OFDM symbol is being processed. At this point, N is assigned a value of N+1 (N=N+1), i.e. taking N+1 as N, and then the operation of 307 is executed to identify whether or not N+1 is between N1 and N2.

In the above embodiment shown in FIG. 6, channel estimation value $C_N^i$ of each RE within the Nth OFDM symbols is acquired one tap or several taps earlier and then stored in the NPCHE buffer unit. When it is monitored that the available space of the NPCHE buffer unit reaches a preset space threshold, channel estimation values of REs within subsequent OFDM symbols containing no pilots are acquired so as to fill the NPCHE buffer unit, which can quickly respond to the request for extracting channel estimation value data by the MIMO demodulation unit, efficiently ensure that the MIMO demodulation unit can extract channel estimation values in real time without waiting, and meet the real-time requirement for extracting channel estimation value data by the MIMO demodulation unit. Based on this embodiment, the real-time problem of the MIMO demodulation unit for extracting the instantaneously acquired channel estimation value data can be solved, thereby realizing the match of processing ability between the CHE unit and the MIMO demodulation unit, enhancing the working efficiency of the MIMO demodulation unit, and further enhancing SOC information processing performance.

Figure 7:
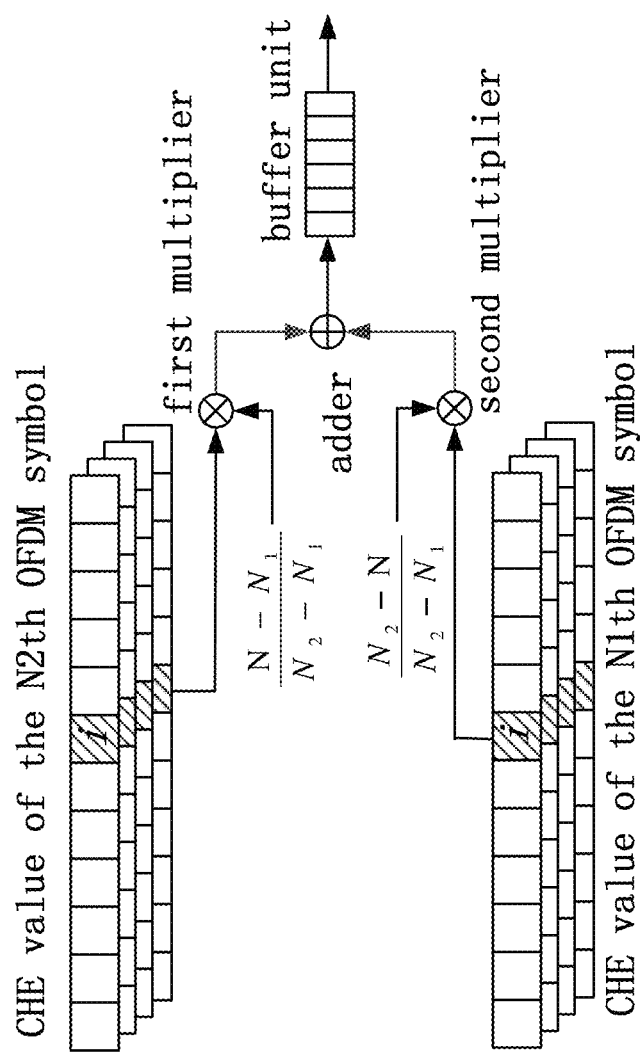
FIG. 7 is a schematic view of the implementation of a linear interpolation method in a pipeline according to an embodiment of the disclosure.

According to one example of the embodiments of the method for acquiring an estimated value of transmitted signal of the disclosure described above, but not limitative, when instantaneously acquiring channel estimation value $C_N^i$ of the ith RE within the Nth OFDM symbol, specifically, a first multiplier, a second multiplier and an adder are implemented in a pipeline, wherein, the first multiplier acquires $$\frac{(N-N1)*C_{N2}^i}{N2-N1} \text{ by } \frac{N-N1}{N2-N1}$$

and channel estimation value $C_{N2}^i$ of each RE within the N2th OFDM symbol, the second multiplier acquires $$\frac{(N2-N)+C_{N2}^i}{N2-N1} \text{ by } \frac{N2-N}{N2-N1}$$

and channel estimation value $C_{N1}^i$ of each RE within the N1th OFDM symbol, the adder acquires channel estimation value $$C_N^i = \frac{(N-N1)+C_{N2}^i}{N2-N1} + \frac{(N2-N)+C_{N1}^i}{N2-N1}$$

of each RE within the Nth OFDM symbol by the output result $$\frac{(N-N1)+C_{N2}^i}{N2-N1}$$

of the first multiplier and the output result $$\frac{(N2-N)+C_{N1}^i}{N2-N1}$$

of the second multiplier. Since the first multiplier, the second multiplier and the adder are implemented in a pipeline, they can separately acquire their respective computation results $$\frac{(N2-N)+C_{N1}^i}{N2-N1}, \frac{(N-N1)+C_{N2}^i}{N2-N1}$$

and $$C_N^i = \frac{(N-N1)+C_{N2}^i}{N2-N1} + \frac{(N2-N)+C_{N1}^i}{N2-N1}$$

in parallel, and furthermore, the first multiplier and the second multiplier can acquire $$\frac{(N2-N)+C_{N1}^i}{N2-N1} \text{ and } \frac{(N-N1)+C_{N2}^i}{N2-N1}$$

in parallel, which, compared with the manner of directly computing $$C_N^i = \frac{(N-N1)+C_{N2}^i}{N2-N1} + \frac{(N2-N)+C_{N1}^i}{N2-N1},$$

efficiently increases the speed for instantaneously acquiring channel estimation value of a RE by adopting a linear interpolation method, and saves the time cost by acquiring channel estimation value of each RE within OFDM symbols containing no pilots. As shown in FIG. 7, it is a schematic view of the implementation of a linear interpolation method in a pipeline of the embodiment of the disclosure.

In order to distinguish the embodiments of the disclosure from the prior art and make the benefit technical effects of the embodiments of the disclosure clear and explicit, a comparison between the disclosure and the prior art will be made by taking a specific application of one embodiment of the disclosure in which MIMO2×2, N1=0, and N2=4 as an example.

Figure 8:
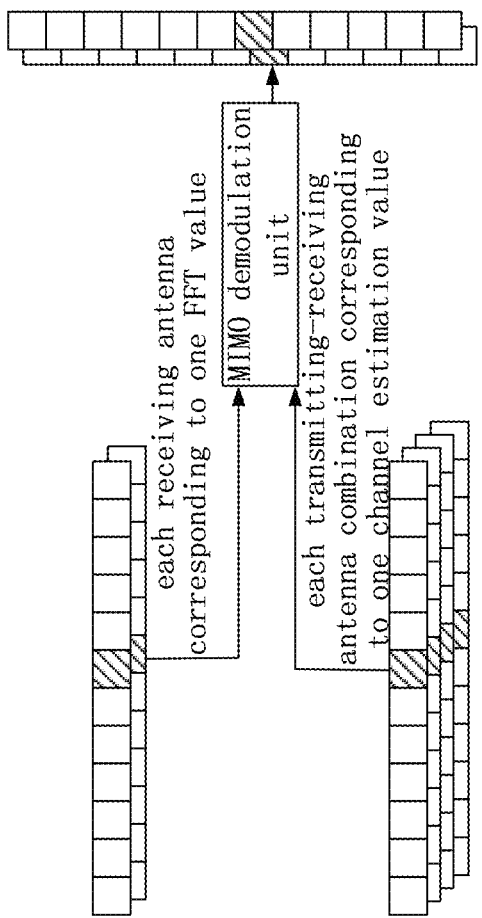
FIG. 8 is a schematic view of a working principle of a MIMO demodulation unit in the application according to an embodiment of the disclosure.

MIMO2×2 means two transmitting antennas and two receiving antennas. MIMO demodulation unit performs demodulation one RE by one RE. To demodulate data on one RE, FFT value of a receiving signal of each receiving antenna corresponding to this RE needs to be extracted, together with channel estimation value corresponding to each transmitting-receiving antenna combination. As shown in FIG. 8 is a schematic view of a working principle of a MIMO demodulation unit in the application according to an embodiment of the disclosure. Since the number of the transmitting antenna and the number of the receiving antenna both are 2, each RE corresponds to 2 FFT values and 2×2=4 channel estimation values.

Figure 1:
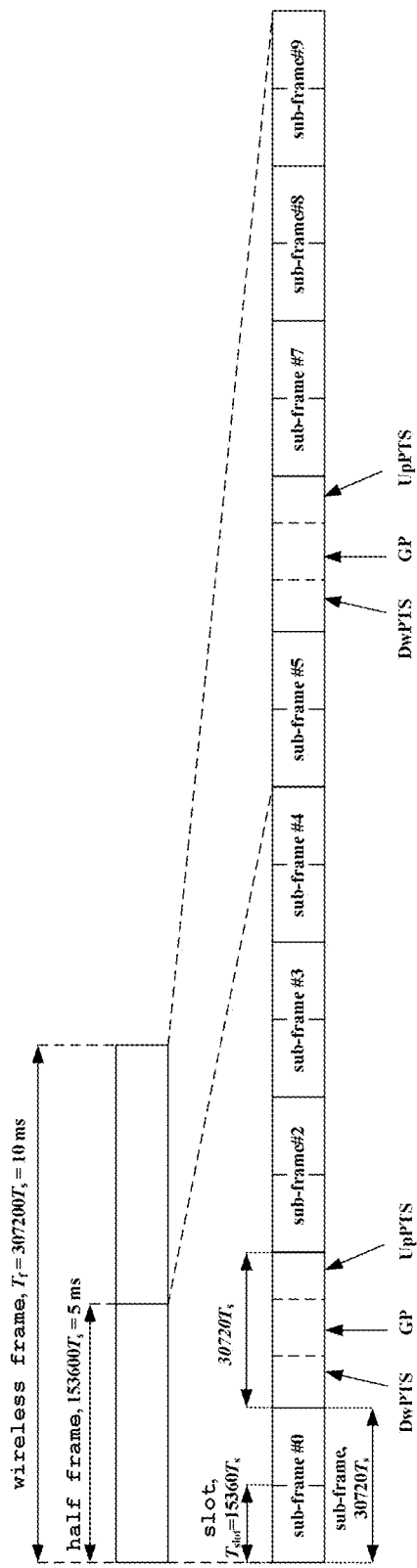
FIG. 1 is a schematic view of a frame structure in a TD-LTE system under a switching cycle of 5 ms.
Figure 2:
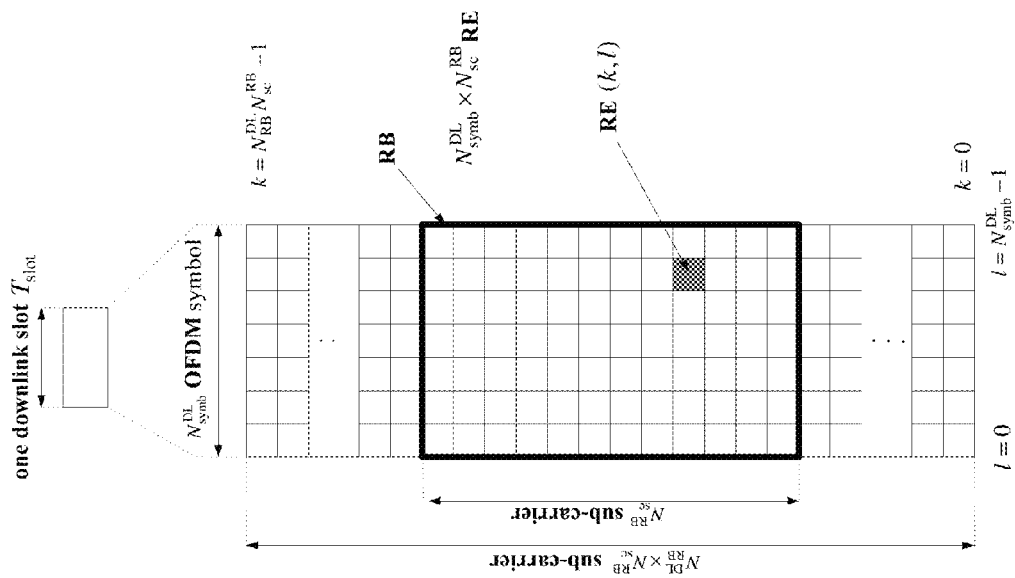
FIG. 2 is a schematic view of a wireless resource structure of each slot in a downlink wireless frame.
Figure 3:
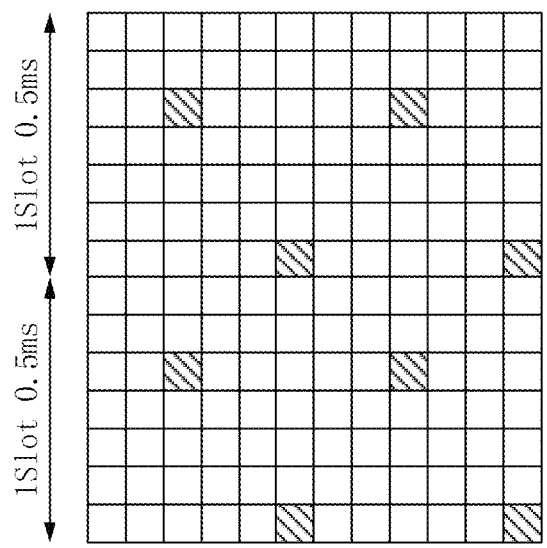
FIG. 3 is an example diagram of a reference channel of two consecutive RBs.

Taking a case in which at most 100 RBs are processed as an example, with reference to FIG. 2, each RB contains 12 sub-carriers, and thus the number of REs to be processed in each OFDM symbol is 1200. As shown in FIG. 8, MIMO demodulation unit needs two sets of FFT values and four sets of channel estimation values for computing an estimated value of transmitted signals of two transmitting antennas on one RE. I-orthogonal signal and Q-orthogonal signal generally perform quantization respectively using 16 bits, and thus one set of I-orthogonal signal and Q-orthogonal signal needs a storage space of 4 bytes (i.e. 32 bits), and each OFDM symbol needs a storage space of 4×1200=4800 bytes.

According to the prior art, for the above application embodiments, the method for acquiring an estimated value of transmitted signal goes as follows:

The 0th to the 4th OFDM symbols are received and buffered, together consuming 5×2×4800=48K bytes, wherein, 5 represents the number of the OFDM symbols, 2 represents the number of the receiving antennas;

Based on the FFT values of the 0th to the 4th OFDM symbols, the CHE unit computes channel estimation values thereof, and then channel estimation values of the 1th to the 3th OFDM symbols are acquired by using a linear interpolation method. In such way, all together, channel estimation values of five OFDM symbols are obtained and stored in the CHE buffer unit, totally consuming 5×4×4800=96K bytes, wherein, 5 means the number of the OFDM symbols is 5, 4 means that each RE corresponds to four sets of channel estimation values;

MIMO demodulation unit extracts FFT values and channel estimation values one OFDM symbol by one OFDM symbol and one RE by one RE in each OFDM symbol, and performs computation processing thereon, thereby obtaining an estimated value for transmitted signals. The processing method goes as follows:

Setting N=0;
Setting i=0;
Extracting an FFT value of the ith RE within the Nth OFDM symbol from the FFT buffer unit, extracting a channel estimation value of the ith RE within the Nth OFDM symbol from the CHE buffer unit, and performing computation processing by using the preset MIMO demodulation algorithm, thereby obtaining an estimated value for transmitted signals on the ith RE;

i=i+1, if i<1200, returning back to execute the previous operation, or, if i=1200, executing the next operation;

N=N+1, if N<4, returning back to execute the operation of setting i=0, or, if N=5, ending the operations.

According to one embodiment of the disclosure, for the above application embodiment, an estimated value for transmitted signals can be acquired as follows:

The 0th to the 4th OFDM symbols are received and buffered, together consuming 5×2×4800=48K bytes, wherein, 5 represents the number of the OFDM symbols, 2 represents the number of the receiving antennas;

Based on the FFT values of the 0th to the 4th OFDM symbols, the CHE unit computes channel estimation values thereof, and stores these values in the CHE buffer unit, together consuming 2×4×4800=38.4K bytes, wherein, 2 means that the number of the OFDM symbols is 2, 4 means that each RE corresponds to four sets of channel estimation values;

MIMO demodulation unit extracts FFT values and channel estimation values one OFDM symbol by one OFDM symbol and one RE by one RE in each OFDM symbol, and performs computation processing thereon, thereby obtaining an estimated value for transmitted signals. The processing method goes as follows:

Setting N=0, identifying whether or not N=N1 or N=N2;
If N=N1, or N=N2, setting i=0;
Extracting an FFT value of the ith RE within the Nth OFDM symbol from the FFT buffer unit, extracting a channel estimation value of the ith RE within the Nth OFDM symbol from the CHE buffer unit, and performing computation processing by using the preset MIMO demodulation algorithm, thereby obtaining an estimated value for transmitted signals on the ith RE;

i=i+1, if i<1200, returning back to execute the previous operation, or, if i=1200, executing the next operation;

N=N+1, if N<5, returning back to execute the operation of identifying whether or not N=N1 or N=N2, or, if N=5, ending the operations;

Otherwise, if N≠N1 and N≠N2, setting i=0;
Instantaneously acquiring channel estimation value $C_N^i$ of the ith RE within the Nth OFDM symbols through $C_{N1}^i$ and $C_{N2}^i$ by the CHE unit adopting a linear interpolation method, extracting an FFT value of the ith RE within the Nth OFDM symbol from the FFT buffer unit by MIMO demodulation unit, and performing computation processing on FFT value and channel estimation value of the ith RE within the Nth OFDM symbol by using the preset MIMO demodulation algorithm, thereby obtaining an estimated value for transmitted signals on the ith RE;

i=i+1, if i<1200, returning back to execute the previous operation, or, if i=1200, executing the next operation;

N=N+1, if N<5, returning back to execute the operation of identifying whether or not N=N1 or N=N2, or, if N=5, ending the operations.

It can be seen from the above application embodiments that, compared with the prior art, the embodiments of the disclosure take up SOC memory 96K−38.4K=57.6K bytes less than the prior art because it stores channel estimation values of three OFDM symbols less. Although buffer units also take up some SOC memory space, such memory space being taken up is very small. It is assumed that the buffer unit has a depth of 8, the size of the SOC memory space taken up by this buffer unit is 8×4×4=0.5 k, wherein, 8 indicates the depth of the buffer unit, the first 4 means that one RE corresponds to four channel estimation values, the second 4 means that one channel estimation value data takes up 4 bytes. It can be seen that, the capacities necessary for the buffer unit is very small, which can be substantially ignored compared with the saved SOC memory. If the buffer unit has a smaller depth, the capacities necessary for this buffer unit become smaller.

Figure 9:
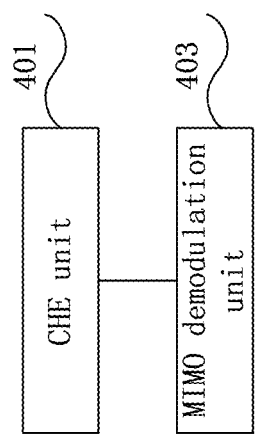
FIG. 9 is a schematic view of a structure of an apparatus for acquiring an estimated value of transmitted signal according to an embodiment of the disclosure.

FIG. 9 is a schematic view of a structure of an apparatus for acquiring an estimated value of transmitted signal according to an embodiment of the disclosure. The apparatus for acquiring an estimated value of transmitted signal of this embodiment can be used for implementing the flow of the method for acquiring an estimated value of transmitted signal of the above various embodiments of the disclosure. As shown in FIG. 9, this apparatus comprises a CHE unit 401 and a MIMO demodulation unit 403, wherein:

CHE unit 401 is configured to in response to a current OFDM symbol with sequence number N being between two adjacent OFDM symbols with sequence numbers N1 and N2 containing pilots, for each RE within the Nth OFDM symbol, instantaneously acquiring a channel estimation value $C_N^i$ of the RE by adopting a linear interpolation method, wherein, i∈[0,L−1], each OFDM symbol includes L REs, L is an integer larger than zero;

MIMO demodulation unit 403, for, extracting an FFT value of the ith RE within the Nth OFDM symbol containing no pilots from the FFT buffer unit, and based on the preset MIMO demodulation algorithm, performing computation processing on the channel estimation value $C_N^i$ and the FFT value of the ith RE within the Nth OFDM symbol, thereby obtaining an estimated value for transmitted signals of the transmitting terminal on the ith RE within the Nth OFDM symbol.

In the apparatus for acquiring an estimated value of transmitted signal provided by the above embodiments of the disclosure, for an OFDM symbol between two adjacent OFDM symbols containing pilots, the CHE unit instantaneously acquires a channel estimation value $C_N^i$ for each RE therein by adopting a linear interpolation method, the MIMO demodulation unit extracts an FFT value of the current RE from the FFT buffer unit, and performs computation processing on the channel estimation value $C_N^i$ and the FFT value of the current RE based on the preset MIMO demodulation algorithm, thereby obtaining an estimated value for transmitted signals of the transmitting terminal on the current RE. Since it is unnecessary to store channel estimation values of the respective OFDM symbols between two adjacent OFDM symbols containing pilots in the CHE buffer unit, SOC memory that would be taken up by storing channel estimation values of the respective OFDM symbols between two adjacent OFDM symbols containing pilots can be saved, thereby reducing SOC chip cost and enhancing SOC information processing performance.

Figure 10:
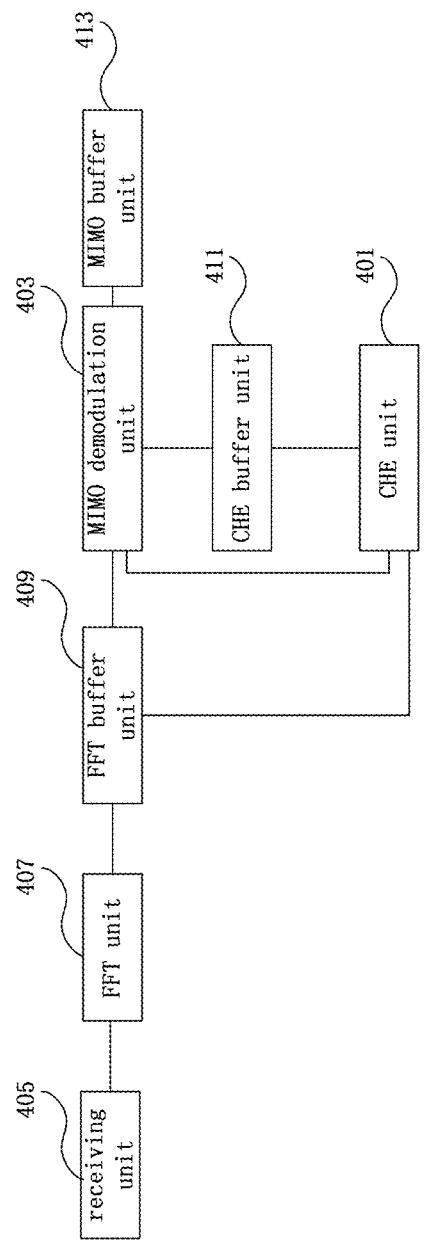
FIG. 10 is a schematic view of a structure of an apparatus for acquiring an estimated value of transmitted signal according to an embodiment of the disclosure.

FIG. 10 is a schematic view of a structure of an apparatus for acquiring an estimated value of transmitted signal according to an embodiment of the disclosure. As shown in FIG. 10, compared with the embodiment shown in FIG. 9, the apparatus for acquiring an estimated value of transmitted signal of this embodiment further comprises a receiving unit 405, an FFT unit 407, an FFT buffer unit 409 and a buffer unit for the channel estimation values of OFDM symbols containing pilots (hereinafter, abbreviated as CHE buffer unit) 411, wherein:

The receiving unit 405 is configured to receive and buffering OFDM symbols.

The FFT unit 407 is configured to perform FFT on the received and buffered OFDM symbols from the receiving unit 405 sequentially, thereby obtaining FFT values of a plurality of buffered OFDM symbols and storing these values in the FFT buffer unit 409.

The FFT buffer unit 409 is configured to store FFT values of OFDM symbols.

Accordingly, the CHE unit 401 is also configured to extract FFT value of each RE within OFDM symbols containing pilots sequentially from the FFT buffer unit 409 and performing channel estimation processing, thereby obtaining channel estimation value $C_K^i$ and storing this value in the CHE buffer unit, wherein, i∈[0,L−1], the values taken by K include N1 and N2; when, for each RE within the Nth OFDM symbols containing no pilots, instantaneously acquiring channel estimation value $C_N^i$ of this RE by adopting a linear interpolation method, specifically, the channel estimation value $C_N^i$ of each RE within the Nth OFDM symbols can be instantaneously acquired through the formula $$C_N^i = \frac{(N-N1) + C_{N2}^i + (N2-N) + C_{N1}^i}{N2 - N1},$$

wherein N1<N2.

The CHE buffer unit 411 is configured to store channel estimation values of OFDM symbols containing pilots.

The MIMO demodulation unit 403 is further configured to identify whether or not the sequence number N of the OFDM symbol currently computed and processed is the sequence number N1 or N2 of two adjacent OFDM symbols containing pilots; in response to that the sequence number N of the OFDM symbol currently processed is the sequence number N1 or N2 which are the sequence numbers of two adjacent OFDM symbols containing pilots, for each RE within the OFDM symbol currently computed and processed, extracting FFT value and channel estimation value corresponding to this RE from the FFT buffer unit 409 and the CHE buffer unit 411 respectively, and based on the preset MIMO demodulation algorithm, performing computation processing on the FFT value and the channel estimation value corresponding to this RE, thereby obtaining an estimated value for transmitted signals of the transmitting terminal on each RE within the OFDM symbol currently processed; otherwise, in response to that the sequence number N of the OFDM symbol currently processed is between the sequence numbers N1 and N2, instructing the CHE unit 401 to adopt a linear interpolation method to instantaneously acquire channel estimation value $C_N^i$ for each RE within this Nth OFDM symbol, and beginning to perform the operation of extracting FFT value of the ith RE within the Nth OFDM symbol from the FFT buffer unit 409.

In the above embodiment of the disclosure, only channel estimation values of OFDM symbols containing pilots are stored in the CHE buffer unit; as for channel estimation value of each RE within OFDM symbols containing no pilots, when computation processing needs to be performed, it can be instantaneously acquired by the CHE unit adopting a linear interpolation method through the use of channel estimation value of each RE within two adjacent OFDM symbols containing pilots, but does not need to be pre-computed and stored, which thus reduces the storage space necessary for the CHE buffer unit compared with the prior art, saves SOC memory that would be taken up by storing channel estimation values of OFDM symbols containing no pilots in the prior art, and reduces SOC chip cost and enhances SOC information processing performance. SOC memory herein includes memory required by the receiving unit 405 for buffering OFDM symbols, the FFT buffer unit 409 and the CHE buffer unit 411.

With reference to FIG. 10 again, according to one example of the embodiments of the apparatus for acquiring an estimated value of transmitted signal of the disclosure, but not limitative, this apparatus further comprises a MIMO buffer unit 413 for storing an estimated value for transmitted signals on each RE within OFDM symbols.

According to one example of the embodiments of the apparatus for acquiring an estimated value of transmitted signal of the disclosure, but not limitative, corresponding to the embodiments of the method for acquiring an estimated value of transmitted signal shown in FIG. 5 of the disclosure, the CHE unit 401 specifically, starting from i=0 and after acquiring channel estimation value $C_N^i$ of the ith RE within the Nth OFDM symbol, identifies whether or not i+1 is less than L; in response to that i+1 is less than L, taking i+1 as i, performing the operation of instantaneously acquiring channel estimation value $C_N^i$ of the ith RE within the Nth OFDM symbol by adopting a linear interpolation method, letting the values of i sequentially be an integer in the range of [0,L−1]; in response that i+1 is not less than L, completing the computation processing on the Nth OFDM, and beginning to process a next OFDM symbol, wherein, N is assigned a value of N+1 (N=N+1), i.e. taking N+1 as N, beginning to perform the operation of identifying whether or not N+1 is between N1 and N2, letting the values of N sequentially be an integer from N1 to N2.

Figure 11:
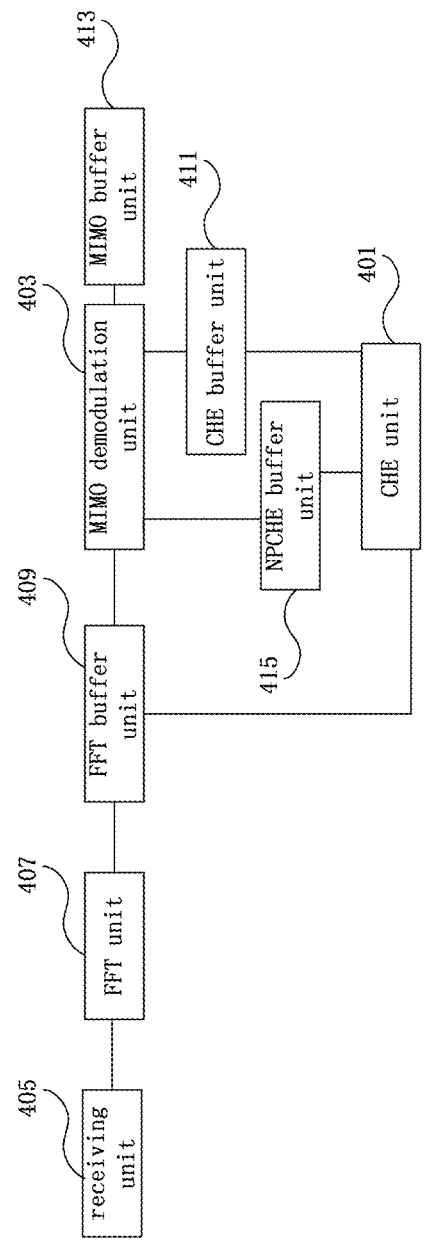
FIG. 11 is a schematic view of a structure of an apparatus for acquiring an estimated value of transmitted signal according to an embodiment of the disclosure.

FIG. 11 is a schematic view of a structure of an apparatus for acquiring an estimated value of transmitted signal according to an embodiment of the disclosure, wherein, the apparatus of this embodiment can be used for implementing the flow of the method of the embodiment shown in FIG. 6. As shown in FIG. 11, compared with the embodiments shown in FIG. 9 or FIG. 10, the apparatus for acquiring an estimated value of transmitted signal of this embodiment further comprises a buffer unit for the channel estimation values of OFDM symbols containing no pilots (hereinafter, abbreviated as NPCHE buffer unit) 415 for storing channel estimation values of REs within OFDM symbols containing no pilots. By way of example, this NPCHE buffer unit can be implemented by means of a FIFO buffer. In this embodiment, when the CHE unit 401 adopts a linear interpolation method to instantaneously acquire channel estimation value $C_N^i$ of the ith RE within the Nth OFDM symbols containing no pilots, specifically, channel estimation value $C_N^i$ of the ith RE within the Nth OFDM symbols are acquired and stored in the NPCHE buffer unit 415, one tap or several taps earlier according to the sequence of computation processing performed on channel estimation values by the MIMO demodulation unit 403, and when it is monitored that the available space of the NPCHE buffer unit 415 reaches a preset space threshold, channel estimation values of REs within subsequent OFDM symbols containing no pilots are acquired so as to fill the NPCHE buffer unit. The NPCHE buffer unit 415 has a depth such that channel estimation values stored in this NPCHE buffer unit 415 can meet the performance requirement for extracting channel estimation values by the MIMO demodulation unit 403. Accordingly, the MIMO demodulation unit 403 is further configured to extract channel estimation value $C_N^i$ of the ith RE within the Nth OFDM symbols containing no pilots from the NPCHE buffer unit 415 when extracting FFT values of the ith RE within this Nth OFDM symbols from FFT buffer unite 409, and performing computation processing on the FFT value and the channel estimation value $C_N^i$ of the ith RE within this Nth OFDM symbols based on the preset MIMO demodulation algorithm.

In the above embodiment shown in FIG. 11, the CHE unit 401 specifically, starting from i=0, instantaneously acquires channel estimation value $C_N^i$ of the ith RE within the Nth OFDM symbol containing no pilots by adopting a linear interpolation method, thereby obtaining an estimated value for transmitted signals of the transmitting terminal on the (L−1)th RE of this Nth OFDM symbol; at this point, computation processing on this Nth OFDM symbol is completed, and a next OFDM symbol is being processed, wherein, N is assigned a value of N+1 (N=N+1), i.e. taking N+1 as N, starting from i=0, instantaneously acquiring channel estimation value $C_N^i$ of the ith RE within the Nth OFDM symbol containing no pilots by adopting a linear interpolation method.

In the above embodiment shown in FIG. 11, after the provision of the NPCHE buffer unit 415, the CHE unit 401 can acquire channel estimation value $C_N^i$ of each RE within the Nth OFDM symbols one tap or several taps earlier and then store these values in the NPCHE buffer unit 415, and when it is monitored that the available space of the NPCHE buffer unit 415 reaches a preset space threshold, channel estimation values of REs within subsequent OFDM symbols containing no pilots are acquired so as to fill the NPCHE buffer unit 415, which can quickly respond to the request for extracting channel estimation value data by the MIMO demodulation unit 403, efficiently ensure that the MIMO demodulation unit 403 can extract channel estimation values in real time without waiting, and meet the real-time requirement for extracting channel estimation value data by the MIMO demodulation unit 403. Based on this embodiment, the real-time problem of the MIMO demodulation unit 403 for extracting the instantaneously acquired channel estimation value data can be solved, thereby realizing the match of processing ability between the CHE unit 401 and the MIMO demodulation unit 403, enhancing the working efficiency of the MIMO demodulation unit 403, and further enhancing SOC information processing performance.

By way of example, the NPCHE buffer unit 415 in the above embodiments of the disclosure can be provided separately or integrated with the CHE unit 401, or can be integrated with the MIMO demodulation unit 403.

According to one example of the embodiments of the apparatus for acquiring an estimated value of transmitted signal of the disclosure described above, but not limitative, corresponding to the embodiments of the method for acquiring an estimated value of transmitted signal of the disclosure, in the apparatus of the various embodiments of the disclosure, the CHE unit 401 specifically can comprise a first multiplier, a second multiplier and an adder, which are implemented in a pipeline, wherein, the first multiplier is used for acquiring $$\frac{(N-N1)+C_{N2}^i}{N2-N1} \text{ by } \frac{N-N1}{N2-N1} \text{ and } C_{N2}^i;$$

the second multiplier is used for acquiring $$\frac{(N2-N)+C_{N1}^i}{N2-N1} \text{ by } \frac{N2-N}{N2-N1} \text{ and } C_{N1}^i;$$

the adder is used for acquiring $$C_N^i = \frac{(N-N1)+C_{N2}^i}{N2-N1} + \frac{(N2-N)+C_{N1}^i}{N2-N1}$$

by the output result $$\frac{(N-N1)+C_{N2}^i}{N2-N1}$$

of the first multiplier and the output result $$\frac{(N2-N)+C_{N1}^i}{N2-N1}$$

of the second multiplier.

Since the first multiplier, the second multiplier and the adder are implemented in a pipeline, they can separately acquire their respective computation results $$\frac{(N2-N)+C_{N1}^i}{N2-N1}, \frac{(N-N1)+C_{N2}^i}{N2-N1} \text{ and }$$

$$C_N^i = \frac{(N-N1)+C_{N2}^i}{N2-N1} + \frac{(N2-N)+C_{N1}^i}{N2-N1}$$

in parallel, and furthermore, the first multiplier and the second multiplier can acquire $$\frac{(N2-N)*C_{N2}^i}{N2-N1} \text{ and } \frac{(N-N1)*C_{N2}^i}{N2-N1}$$

in parallel, which, compared with the manner of directly computing $$C_N^i = \frac{(N-N1)+C_{N2}^i}{N2-N1} + \frac{(N2-N)+C_{N1}^i}{N2-N1},$$

efficiently increases the speed for instantaneously acquiring channel estimation value of a RE by adopting a linear interpolation method, and saves the time cost by acquiring channel estimation value of each RE within OFDM symbols containing no pilots.

The embodiments of the disclosure further provide a SOC comprising the apparatus for acquiring an estimated value of transmitted signal of the various embodiments of the disclosure.

Since it is unnecessary to store channel estimation values of the respective OFDM symbols between two adjacent OFDM symbols containing pilots, the SOC provided by the above embodiments of the disclosure can save SOC memory that would be taken up by storing channel estimation values of the respective OFDM symbols between two adjacent OFDM symbols containing pilots, and thus reduce SOC chip cost and enhance SOC information processing performance.

In addition, the embodiments of the disclosure further provide a receiving device as a receiving terminal which comprises the SOC of the above embodiments of the disclosure.

Since it is unnecessary to store channel estimation values of the respective OFDM symbols between two adjacent OFDM symbols containing pilots, the receiving device provided by the above embodiments of the disclosure can save SOC memory that would be taken up by storing channel estimation values of the respective OFDM symbols between two adjacent OFDM symbols containing pilots, and thus reduce SOC chip cost and enhance SOC information processing performance.

One of ordinary skill in the art can understand that, constituent units in the apparatus for acquiring an estimated value of transmitting signal, the SOC and the receiving device of the above various embodiments of the disclosure can be implemented by software or by hardware. Moreover, these constituent units in the apparatus for acquiring an estimated value of transmitting signal, the SOC and the receiving device of the above various embodiments of the disclosure are not necessarily essential for implementing the embodiments of the disclosure and are not limitative. Furthermore, the constituent units of the apparatus for acquiring an estimated value of transmitted signal also can be distributed in other constituent units of the SOC according to practical needs, and the positions of these constituent units also can be adjusted as needed, for example, these constituent units can be disposed in different SOCs. Among the constituent units of the apparatus for acquiring an estimated value of transmitting signal, several constituent units can be implemented by being combined as one unit, or one constituent unit can be implemented by being divided as several sub-units. Besides, the connection relation between constituent units of the apparatus for acquiring an estimated value of transmitted signal merely indicates an example of an information flow relation based on the disclosure, but is neither limited as a physical connection relation, nor essential or limitative to the implementation of the disclosure.

Various embodiments of the disclosure have been described in a progressive way, and each embodiment focuses on its difference from other embodiments, and thus the same or similar parts among various embodiments can see each other. As for the apparatus and device embodiments, since they are substantially corresponding to their method embodiments, descriptions thereof are relatively simple and reference can be made to the corresponding description of the respective method embodiments.

One of ordinary skill in the art can understand that, all or partial steps for implementing the above method embodiments can be realized by relevant hardware instructed by programs, and these programs can be stored on a computer readable storage medium and perform the steps of the above method embodiments when being executed; moreover, the above storage medium comprises various media capable of storing program codes, such as ROM, RAM, magnetic disk or optical disk.

The receiving device of the embodiments of the disclosure does not need to store channel estimation values of the respective OFDM symbols between two adjacent OFDM symbols containing pilots, which can save SOC memory that would be taken up by storing channel estimation values of the respective OFDM symbols between two adjacent OFDM symbols containing pilots, and thus reduce SOC chip cost and enhance SOC information processing performance.

The channel estimation value $C_N^i$ of the ith RE within the Nth OFDM symbols can be acquired by adopting a linear interpolation method one tap or several taps earlier according to the sequence of the computation processing performed by the MIMO demodulation unit on the channel estimation values and then can be stored in the NPCHE buffer unit for being called by the MIMO demodulation unit. This can solve the real-time problem of the MIMO demodulation unit for extracting the instantaneously acquired channel estimation value data, efficiently ensure that the MIMO demodulation unit can extract channel estimation values in real time without waiting, and meet the real-time requirement for extracting channel estimation value data by the MIMO demodulation unit.

The first multiplier, the second multiplier and the adder are implemented in a pipeline, which efficiently increases the speed for instantaneously acquiring channel estimation value of a RE by adopting a linear interpolation method, saves the time cost by acquiring channel estimation value of each RE within OFDM symbols containing no pilots and thus enhances the efficiency for acquiring channel estimation values of OFDM symbols containing no pilots.

The disclosure is presented in an illustrative and descriptive manner, but is not exclusive or limited to the disclosed forms. Many modifications and variations are obvious to one of ordinary skill in the art. The embodiments are selected and described in such a way that the principle and practical application of the disclosure can be better explained. Moreover, one of ordinary skill in the art can understand the disclosure and thus can design various embodiments with various modifications for specific use.

What is claimed is:

1. A method for acquiring estimated values of transmitted signals, comprising:
in response to a current orthogonal frequency division multiplexing (OFDM) symbol with sequence number N being between two adjacent OFDM symbols which sequence numbers are N1 and N2 respectively containing pilots, for each resource element (RE) within the Nth OFDM symbol, instantaneously acquiring a channel estimation value $C_N^i$ of said RE by linear interpolation, wherein $C_N^i$ represents a channel estimation value of the ith RE within said Nth OFDM symbol, i∈[0,L−1], each OFDM symbol contains L REs, and L is an integer larger than zero;
extracting an FFT value of said ith RE within said Nth OFDM symbol from a Fast Fourier Transform (FFT) buffer unit; and
performing computation processing on said channel estimation value $C_N^i$ and said FFT value of said ith RE within said Nth OFDM symbol based on a preset multiple input multiple output (MIMO) demodulation algorithm, thereby obtaining an estimated value of a transmitted signal of a transmitting terminal on said ith RE within said Nth OFDM symbol;
wherein, for each RE within said Nth OFDM symbols, instantaneously acquiring channel estimation value $C_N^i$ of said RE by adopting a linear interpolation method, comprises: based on channel estimation value $C_K^i$ of each RE within said N1th and said N2th OFDM symbols, by means of formula $$C_N^i = \frac{(N-N1) + C_{N2}^i + (N2-N) + C_{N1}^i}{N2-N1},$$

instantaneously acquiring channel estimation value $C_N^i$ of each RE within said Nth OFDM symbols, wherein N1<N2.

2. The method of claim 1, further comprising:
performing FFT on said received and buffered OFDM symbols sequentially, thereby obtaining FFT values of a plurality of buffered OFDM symbols and storing said FFT values in an FFT buffer unit, wherein said FFT buffer unit contains FFT values of the N1th OFDM symbol to the N2th OFDM symbol;
from said FFT buffer unit, sequentially extracting said FFT value of each RE within OFDM symbols containing pilots and performing channel estimation processing, thereby obtaining a channel estimation value $C_K^i$ and storing $C_K^i$ in a channel estimation (CHE) buffer unit, wherein, i∈[0,L−1], and the values taken by K include N1 and N2;
identifying whether the sequence number N of said OFDM symbol currently processed is said sequence number N1 or N2 which are sequence numbers of two adjacent OFDM symbols containing pilots;
when said sequence number N of said OFDM symbol currently processed is said sequence number N1 or N2, for each RE within said OFDM symbol currently processed, extracting said FFT value and said channel estimation value corresponding to this RE from said FFT buffer unit and said CHE buffer unit respectively, and based on said preset MIMO demodulation algorithm, performing computation processing on said FFT value and said channel estimation value corresponding to this RE, thereby obtaining an estimated value for transmitted signals of said transmitting terminal on each RE within said OFDM symbol currently processed; and
when said sequence number N of said current OFDM symbol is between said sequence numbers N1 and N2, for each RE within said Nth OFDM symbols, performing said operation of instantaneously acquiring channel estimation value $C_N^i$ of said RE by adopting a linear interpolation method, wherein, for each RE within said Nth OFDM symbols, instantaneously acquiring channel estimation value $C_N^i$ of said RE by adopting a linear interpolation method, comprises: based on channel estimation value $C_K^i$ of each RE within said N1th and said N2th OFDM symbols, by means of formula $$C_N^i = \frac{(N-N1) + C_{N2}^i + (N2-N) + C_{N1}^i}{N2-N1},$$

instantaneously acquiring channel estimation value $C_N^i$ of each RE within said Nth OFDM symbols, wherein N1<N2.

3. The method of claim 2, wherein said instantaneously acquiring channel estimation value $C_N^i$ by said linear interpolation, comprises:
according to said sequence of computation processing performed on channel estimation values by said MIMO demodulation unit at least one tap earlier, acquiring channel estimation value $C_N^i$ by adopting a linear interpolation method and storing this value in an no pilot channel estimation (NPCHE) buffer unit, and when it is monitored that said available space of said NPCHE buffer unit reaches a preset space threshold, acquiring channel estimation values of REs within subsequent OFDM symbols containing no pilots so as to fill said NPCHE buffer unit; wherein said NPCHE buffer unit has a depth such that channel estimation values stored in said NPCHE buffer unit meets performance requirement for extracting channel estimation values by said MIMO demodulation unit;
extracting a channel estimation value $C_N^i$ of said ith RE within said Nth OFDM symbol from said NPCHE buffer unit while extracting an FFT value of said ith RE within said Nth OFDM symbol from said FFT buffer unit, so as to perform computation processing on said channel estimation value $C_N^i$ and said FFT value of said ith RE within said Nth OFDM symbol based on said preset MIMO demodulation algorithm.

4. The method of claim 3, wherein said NPCHE buffer unit includes a first in first out (FIFO) buffer.

5. The method of any one of claim 2, wherein, when instantaneously acquiring channel estimation value $C_N^i$ of each RE within said Nth OFDM symbols by means of formula $$C_N^i = \frac{(N-N1) + C_{N_2}^i + (N2-N) + C_{N_2}^i}{N2-N1},$$

a first multiplier, a second multiplier and an adder are implemented in a pipeline, wherein, said first multiplier acquires $$\frac{(N-N1) + C_{N_2}^i}{N2-N1} \text{ by } \frac{N2-N}{N2-N1}$$

and channel estimation value $C_{N2}^i$ of each RE within said N2th OFDM symbol, said second multiplier acquires $$\frac{(N2-N) + C_{N_1}^i}{N2-N1} \text{ by } \frac{N2-N}{N2-N1}$$

and channel estimation value $C_{N1}^i$ of each RE within said N1th OFDM symbol, said adder acquires channel estimation value $$C_N^i = \frac{(N-N1) + C_{N_2}^i}{N2-N1} + \frac{(N2-N) + C_{N_1}^i}{N2-N1}$$

of each RE within said Nth OFDM symbol by said output result $$\frac{(N-N1) + C_{N_2}^i}{N2-N1}$$

of said first multiplier and said output result $$\frac{(N2-N) + C_{N_1}^i}{N2-N1}$$

of said second multiplier.

6. An apparatus for acquiring an estimated value of transmitting signal, comprising:
   a channel estimation (CHE) unit, configured to in response to a current orthogonal frequency division multiplexing (OFDM) symbol with sequence number N being between two adjacent OFDM symbols with sequence numbers N1 and N2 respectively containing pilots, for each resource element (RE) within the Nth OFDM symbol, instantaneously acquiring a channel estimation value $C_N^i$ of said RE by adopting a linear interpolation method, by means of formula $$C_N^i = \frac{(N-N1) + C_{N_2}^i + (N2-N) + C_{N_1}^i}{N2-N1},$$

wherein, N1<N2, $C_{N1}^i$ and $C_{N2}^i$ respectively represent a channel estimation value of the ith RE within the N1th and N2th OFDM symbol, $C_N^i$ represents a channel estimation value of the ith RE within the Nth OFDM symbol, i∈[0,L−1],
   multiple input multiple output (MIMO) demodulation unit, configured to extract an Fast Fourier Transform (FFT) value of said ith RE within said Nth OFDM symbol from said FFT buffer unit, and based on said preset MIMO demodulation algorithm, performing computation processing on said channel estimation value $C_N^i$ and said FFT value of said ith RE within said Nth OFDM symbol, thereby obtaining an estimated value for a transmitted signal of a transmitting terminal on said ith RE within said Nth OFDM symbol.

7. The apparatus of claim 6, further comprising a receiving unit, an FFT unit, an FFT buffer unit and a channel estimation (CHE) buffer unit, wherein:
   said receiving unit is configured to receive and buffer OFDM symbols;
   said FFT unit is configured to perform FFT on said received and buffered OFDM symbols sequentially, thereby obtaining FFT values of a plurality of buffered OFDM symbols and storing these values in said FFT buffer unit;
   said FFT buffer unit is configured to store FFT values of OFDM symbols, comprising FFT values of said N1th OFDM symbol to said N2th OFDM symbol;
   said CHE unit is further configured to extract sequentially from said FFT buffer unit FFT value of each RE within OFDM symbols containing pilots and performing channel estimation processing, thereby obtaining a channel estimation value $C_K^i$ and storing this value in said CHE buffer unit, wherein, i∈[0,L−1], said values taken by K include N1 and N2; when, for each RE within said Nth OFDM symbols, instantaneously acquiring channel estimation value $C_N^i$ of said RE by adopting a linear interpolation method, specifically, by means of formula $$C_N^i = \frac{(N-N1) + C_{N_2}^i + (N2-N) + C_{N_2}^i}{N2-N1},$$

instantaneously acquiring channel estimation value $C_N^i$ of each RE within said Nth OFDM symbols, wherein, N1<N2;
   said CHE buffer unit is configured to store channel estimation values of OFDM symbols containing pilots;
   said MIMO demodulation unit is further configured to identify whether or not said sequence number N of said OFDM symbol currently processed is said sequence number N1 or N2 which are sequence numbers of two adjacent OFDM symbols containing pilots; in response to that said sequence number N of said OFDM symbol currently computed and processed is said sequence number N1 or N2, for each RE within said OFDM symbol currently processed, extracting FFT value and channel estimation value corresponding to this RE from said FFT buffer unit and said CHE buffer unit respectively, and based on said preset MIMO demodulation algorithm, performing computation processing on said FFT value and said channel estimation value corresponding to this RE, thereby obtaining an estimated value for transmitted signals of said transmitting terminal on each RE within said OFDM symbol currently processed; otherwise, in response to that said sequence number N of said current OFDM is between said sequence numbers N1 and N2, instructing said CHE unit to adopt a linear interpolation method to instantaneously acquiring channel estimation value $C_N^i$ for each RE within this Nth OFDM symbol, and performing said operation of extracting FFT value of said ith RE within said Nth OFDM symbol from said FFT buffer unit.

8. The apparatus of claim 7, further comprising a MIMO buffer unit for storing an estimated value for transmitted signals on each RE within OFDM symbols acquired by said MIMO demodulation unit.

9. The apparatus of claim 7, further comprising a no pilot channel estimation (NPCHE) buffer unit in which:
   when said CHE unit adopts a linear interpolation method to instantaneously acquire channel estimation value $C_N^i$ of RE, specifically, channel estimation value $C_N^i$ are acquired and stored in said NPCHE buffer unit, one tap or several taps earlier according to said sequence of computation processing performed on channel estimation values by said MIMO demodulation unit, and when it is monitored that said available space of said NPCHE buffer unit reaches a preset space threshold, channel estimation values of REs within subsequent OFDM symbols containing no pilots are acquired so as to fill said NPCHE buffer unit; wherein, said NPCHE buffer unit has a depth such that channel estimation values stored in said NPCHE buffer unit meets performance requirements for extracting channel estimation values by said MIMO demodulation unit;
   said NPCHE buffer unit is configured to store channel estimation values of REs within OFDM symbols containing no pilots; and
   said MIMO demodulation unit is further configured to extract channel estimation value $C_N^i$ of said ith RE within said Nth OFDM symbols containing no pilots from said NPCHE buffer unit while extracting FFT value of said ith RE within this Nth OFDM symbols, so as to perform computation processing on said FFT value and said channel estimation value $C_N^i$ of said ith RE within this Nth OFDM symbols based on said preset MIMO demodulation algorithm.

10. The apparatus of claim 9, wherein said NPCHE buffer unit includes a first in first out (FIFO) buffer.

11. The apparatus of claim 9, wherein said NPCHE buffer unit is provided integrally with said CHE unit; or
   said NPCHE buffer unit is provided integrally with said MIMO demodulation unit.

12. The apparatus of claim 7, wherein said CHE unit comprises a first multiplier, a second multiplier and an adder which are implemented in a pipeline;
wherein, said first multiplier acquires $$\frac{(N-N1)+C_{N_2}^i}{N2-N1} \text{ by } \frac{N2-N}{N2-N1}$$

and channel estimation value $C_{N2}^i$ of each RE within said N2th OFDM symbol, said second multiplier acquires $$\frac{(N2-N)+C_{N_2}^i}{N2-N1} \text{ by } \frac{N2-N}{N2-N1}$$

and channel estimation value of each RE within said N1th OFDM symbol, said adder acquires channel estimation value $$C_N^i = \frac{(N-N1)+C_{N_s}^i}{N2-N1} + \frac{(N2-N)+C_{N_2}^i}{N2-N1}$$

of each RE within said Nth OFDM symbol by said output result $$\frac{(N-N1)+C_{N_2}^i}{N2-N1}$$

of said first multiplier and said output result $$\frac{(N2-N)+C_{N_2}^i}{N2-N1}$$

of said second multiplier.

13. A system-on-chip, comprising the apparatus for acquiring estimated value of transmitted signal according to claim 6.

14. A receiving device, comprising the system-on-chip (SOC) of claim 13.

* * * * *

UNITED STATES PATENT AND TRADEMARK OFFICE
CERTIFICATE OF CORRECTION

PATENT NO. : 9,025,649 B2
APPLICATION NO. : 13/788506
DATED : May 5, 2015
INVENTOR(S) : Jingxin Liang et al.

It is certified that error appears in the above-identified patent and that said Letters Patent is hereby corrected as shown below:

In the specification,

In Column 1, Line 56, please delete formula "$N_{RB}^{DL} * N_{SC}^{RE}$" and insert -- $N_{RB}^{DL} * N_{SC}^{RB}$ --

In Column 10, between Lines 1-4, please delete formula "$\frac{(N2-N)+C_{N2}^i}{N2-N1}$ by $\frac{N2-N}{N2-NI}$" and insert -- $\frac{(N2-N)*C_{N1}^i}{N2-N1}$ by $\frac{N2-N}{N2-NI}$ --

In Column 10, line 10, please delete formula "$C_N^i = \frac{(N-N1)+C_{N2}^i}{N2-N1} + \frac{(N2-N)+C_{N1}^i}{N2-N1}$" and insert -- $C_N^i = \frac{(N-N1)*C_{N2}^i}{N2-N1} + \frac{(N2-N)*C_{N1}^i}{N2-N1}$ --

In Column 10, line 17, please delete formula "$\frac{(N-N1)+C_{N2}^i}{N2-N1}$" and insert -- $\frac{(N-N1)*C_{N2}^i}{N2-N1}$ --

In Column 10, line 24, please delete formula "$\frac{(N2-N)+C_{N1}^i}{N2-N1}$" and insert -- $\frac{(N2-N)*C_{N1}^i}{N2-N1}$ --

In Column 10, line 32, please delete formula "$\frac{(N2-N)+C_{N1}^i}{N2-N1}, \frac{(N-N1)+C_{N2}^i}{N2-N1}$" and insert -- $\frac{(N2-N)*C_{N1}^i}{N2-N1}, \frac{(N-N1)*C_{N2}^i}{N2-N1}$ --

Signed and Sealed this
Twentieth Day of October, 2015

Michelle K. Lee
*Director of the United States Patent and Trademark Office*

CERTIFICATE OF CORRECTION (continued)
U.S. Pat. No. 9,025,649 B2

In Column 10, line 38, please delete formula "$C_N^i = \frac{(N-N1)+C_{N2}^i}{N2-N1} + \frac{(N2-N)+C_{N1}^i}{N2-N1}$" and insert -- $C_N^i = \frac{(N-N1)*C_{N2}^i}{N2-N1} + \frac{(N2-N)*C_{N1}^i}{N2-N1}$ --

In Column 10, line 46, please delete formula "$\frac{(N2-N)+C_{N1}^i}{N2-N1}$ and $\frac{(N-N1)+C_{N2}^i}{N2-N1}$" and insert -- $\frac{(N2-N)*C_{N1}^i}{N2-N1}$ and $\frac{(N-N1)*C_{N2}^i}{N2-N1}$ --

In Column 10, line 53, please delete formula "$C_N^i = \frac{(N-N1)+C_{N2}^i}{N2-N1} + \frac{(N2-N)+C_{N1}^i}{N2-N1}$" and insert -- $C_N^i = \frac{(N-N1)*C_{N2}^i}{N2-N1} + \frac{(N2-N)*C_{N1}^i}{N2-N1}$ --

In Column 14, line 10, please delete formula "$C_N^i = \frac{(N-N1)+C_{N2}^i+(N2-N)+C_{N1}^i}{N2-N1}$" and insert -- $C_N^i = \frac{(N-N1)*C_{N2}^i+(N2-N)*C_{N1}^i}{N2-N1}$ --

In Column 16, line 44, please delete the formula before the word by "$\frac{(N-N1)+C_{N2}^i}{N2-N1}$" and insert -- $\frac{(N-N1)*C_{N2}^i}{N2-N1}$ --

In Column 16, Line 51, please delete the formula before the word by "$\frac{(N2-N)+C_{N1}^i}{N2-N1}$" and insert -- $\frac{(N2-N)*C_{N1}^i}{N2-N1}$ --

In Column 16, line 58, please delete formula "$C_N^i = \frac{(N-N1)+C_{N2}^i}{N2-N1} + \frac{(N2-N)+C_{N1}^i}{N2-N1}$" and insert -- $C_N^i = \frac{(N-N1)*C_{N2}^i}{N2-N1} + \frac{(N2-N)*C_{N1}^i}{N2-N1}$ --

CERTIFICATE OF CORRECTION (continued)
U.S. Pat. No. 9,025,649 B2

In Column 16, Line 64, please delete formula "$\frac{(N-N1)+C^i_{N2}}{N2-N1}$" and insert -- $\frac{(N-N1)*C^i_{N2}}{N2-N1}$ --

In Column 17, Line 5, please delete formula "$\frac{(N2-N)+C^i_{N1}}{N2-N1}$" and insert -- $\frac{(N2-N)*C^i_{N1}}{N2-N1}$ --

In Column 17, Line 14, please delete formula "$\frac{(N2-N)+C^i_{N1}}{N2-N1}, \frac{(N-N1)+C^i_{N2}}{N2-N1}$" and insert -- $\frac{(N2-N)*C^i_{N1}}{N2-N1}, \frac{(N-N1)*C^i_{N2}}{N2-N1}$ --

In Column 17, Line 16, please delete formula "$C^i_N = \frac{(N-N1)+C^i_{N2}}{N2-N1} + \frac{(N2-N)+C^i_{N1}}{N2-N1}$" and insert -- $C^i_N = \frac{(N-N1)*C^i_{N2}}{N2-N1} + \frac{(N2-N)*C^i_{N1}}{N2-N1}$ --

In Column 17, Line 32, please delete formula "$C^i_N = \frac{(N-N1)+C^i_{N2}}{N2-N1} + \frac{(N2-N)+C^i_{N1}}{N2-N1}$" and insert -- $C^i_N = \frac{(N-N1)*C^i_{N2}}{N2-N1} + \frac{(N2-N)*C^i_{N1}}{N2-N1}$ --

In the claims,

In Claim 1, Column 19, Line 46, please delete formula "$C^i_N = \frac{(N-N1)+C^i_{N2}+(N2-N)+C^i_{N1}}{N2-N1}$" and insert -- $C^i_N = \frac{(N-N1)*C^i_{N2}+(N2-N)*C^i_{N1}}{N2-N1}$ --

In Claim 2, Column 20, Line 30, please delete formula "$C^i_N = \frac{(N-N1)+C^i_{N2}+(N2-N)+C^i_{N1}}{N2-N1}$" and insert -- $C^i_N = \frac{(N-N1)*C^i_{N2}+(N2-N)*C^i_{N1}}{N2-N1}$ --

In Claim 5, Column 21, Line 2, please delete formula " $C_N^i = \frac{(N-N1)+C_{N2}^i+(N2-N)+C_{N2}^i}{N2-N1}$ " and insert -- $C_N^i = \frac{(N-N1)*C_{N2}^i+(N2-N)*C_{N1}^i}{N2-N1}$ --

In Claim 5, Column 21, Line 10, please delete the formula before the word by " $\frac{(N-N1)+C_{N2}^i}{N2-N1}$ "

and insert -- $\frac{(N-N1)*C_{N2}^i}{N2-N1}$ --

In Claim 5, Column 21, Line 17, please delete the formula before the word by " $\frac{(N2-N)+C_{N1}^i}{N2-N1}$ "

and insert -- $\frac{(N2-N)*C_{N1}^i}{N2-N1}$ --

In Claim 5, Column 21, Line 26, please delete formula " $C_N^i = \frac{(N-N1)+C_{N2}^i}{N2-N1} + \frac{(N2-N)+C_{N1}^i}{N2-N1}$ "

and insert -- $C_N^i = \frac{(N-N1)*C_{N2}^i}{N2-N1} + \frac{(N2-N)*C_{N1}^i}{N2-N1}$ --

In Claim 5, Column 21, Line 34, please delete formula " $\frac{(N-N1)+C_{N2}^i}{N2-N1}$ " and insert -- $\frac{(N-N1)*C_{N2}^i}{N2-N1}$ --

In Claim 5, Column 21, Line 40, please delete formula " $\frac{(N2-N)+C_{N1}^i}{N2-N1}$ " and insert -- $\frac{(N2-N)*C_{N1}^i}{N2-N1}$ --

In Claim 6, Column 21, Line 58, please delete formula " $C_N^i = \frac{(N-N1)+C_{N2}^i+(N2-N)+C_{N1}^i}{N2-N1}$ " and insert -- $C_N^i = \frac{(N-N1)*C_{N2}^i+(N2-N)*C_{N1}^i}{N2-N1}$ --

In Claim 7, Column 22, Line 35, please delete formula " $C_N^i = \frac{(N-N1)+C_{N2}^i+(N2-N)+C_{N2}^i}{N2-N1}$ " and insert -- $C_N^i = \frac{(N-N1)*C_{N2}^i+(N2-N)*C_{N1}^i}{N2-N1}$ --

CERTIFICATE OF CORRECTION (continued)
U.S. Pat. No. 9,025,649 B2

In Claim 12, Column 24, Line 5, please delete the formula before the word by " $\frac{(N-N1)+C^i_{N2}}{N2-N1}$ "

and insert -- $\frac{(N-N1)*C^i_{N2}}{N2-N1}$ --

In Claim 12, Column 24, Line 12, please delete the formula before the word by " $\frac{(N2-N)+C^i_{N2}}{N2-N1}$ "

and insert -- $\frac{(N2-N)*C^i_{N1}}{N2-N1}$ --

In Claim 12, Column 24, Line 15, after the word value, please insert -- $C^i_{N1}$ --

In Claim 12, Column 24, Line 21, please delete formula " $C^i_N = \frac{(N-N1)+C^i_{NS}}{N2-N1} + \frac{(N2-N)+C^i_{N2}}{N2-N1}$ "

and insert -- $C^i_N = \frac{(N-N1)*C^i_{N2}}{N2-N1} + \frac{(N2-N)*C^i_{N1}}{N2-N1}$ --

In Claim 12, Column 24, Line 29, please delete formula " $\frac{(N-N1)+C^i_{N2}}{N2-N1}$ " and insert -- $\frac{(N-N1)*C^i_{N2}}{N2-N1}$ --

In Claim 12, Column 24, Line 35, please delete formula " $\frac{(N2-N)+C^i_{N2}}{N2-N1}$ " and insert -- $\frac{(N2-N)*C^i_{N1}}{N2-N1}$ --